May 22, 1951     V. J. BURNELLI     2,554,009
AIRPLANE LANDING GEAR

Filed July 18, 1945     2 Sheets-Sheet 1

INVENTOR
Vincent J. Burnelli
BY
Frederick W. Harker
ATTORNEY

May 22, 1951      V. J. BURNELLI      2,554,009
AIRPLANE LANDING GEAR

Filed July 18, 1945      2 Sheets-Sheet 2

INVENTOR
Vincent J. Burnelli
BY Frederick T. Barker
ATTORNEY

Patented May 22, 1951

2,554,009

UNITED STATES PATENT OFFICE 2,554,009

AIRPLANE LANDING GEAR

Vincent J. Burnelli, Englewood, N. J.

Application July 18, 1945, Serial No. 605,801

3 Claims. (Cl. 244—102)

This invention relates to the type of landing gear with operational advantages as described in the Burnelli Patent No. 1,918,688, issued July 18, 1933. The retractable arrangement provided in the present application represents a new and advanced feature, the basis of which comprises the following:

1. A lifting fuselage airplane of the Burnelli type consisting of a landing gear, shock absorbing strut pivotally connected to the base of the spar wing fitting at its junction to a fuselage bulkhead located rearward of the centre of gravity of the airplane.

2. The above landing gear attachment arrangement combined with an oleo strut for retraction located at the top of said wing spar getting attachment to the bulkhead.

3. Said strut in the extended position engaging a fitting operated for synchronized release with the retracting strut and which imposes the side and rear loads to the fuselage bulkhead thereby eliminating external bracing for the restraint of these loads.

4. A well located in the outboard wing panels in the region of the rear spar and provided with arched wing spars for clearing said well and which are a division of the basic outboard spar section.

5. An airfoil fuselage entering edge provided with a cargo compartment forward of the front spar bulkhead for balacing said wing fuselage design to bring the centre of gravity forward with capacity load in the rear in order that the airplane would not tend to over balance rearward with the rear wheels set in their best arrangement for landing efficiency.

6. A landing wheel support attached to the entering edge section of the wing body supported by frames extending from the forward bulkhead, which frames form the pilots' compartment. Linked retracting struts are provided for moving the wheel and its support to a concealed location within the forward cargo compartment.

Due to the controversy that continues to exist as to the merit or demerit of the three wheel type of landing gear in comparison with the conventional, it is believed that the incorporation of these details is desirable, especially considering the early work in the reduction to practice of this type of landing technique as covered in the patent referred to hereinbefore.

Other features and advantages of my invention will hereinafter appear.

In the drawings:

Fig. 5 is a diagrammatic view of the hydraulic system employed in wheel retraction and locking.

Figure 1:
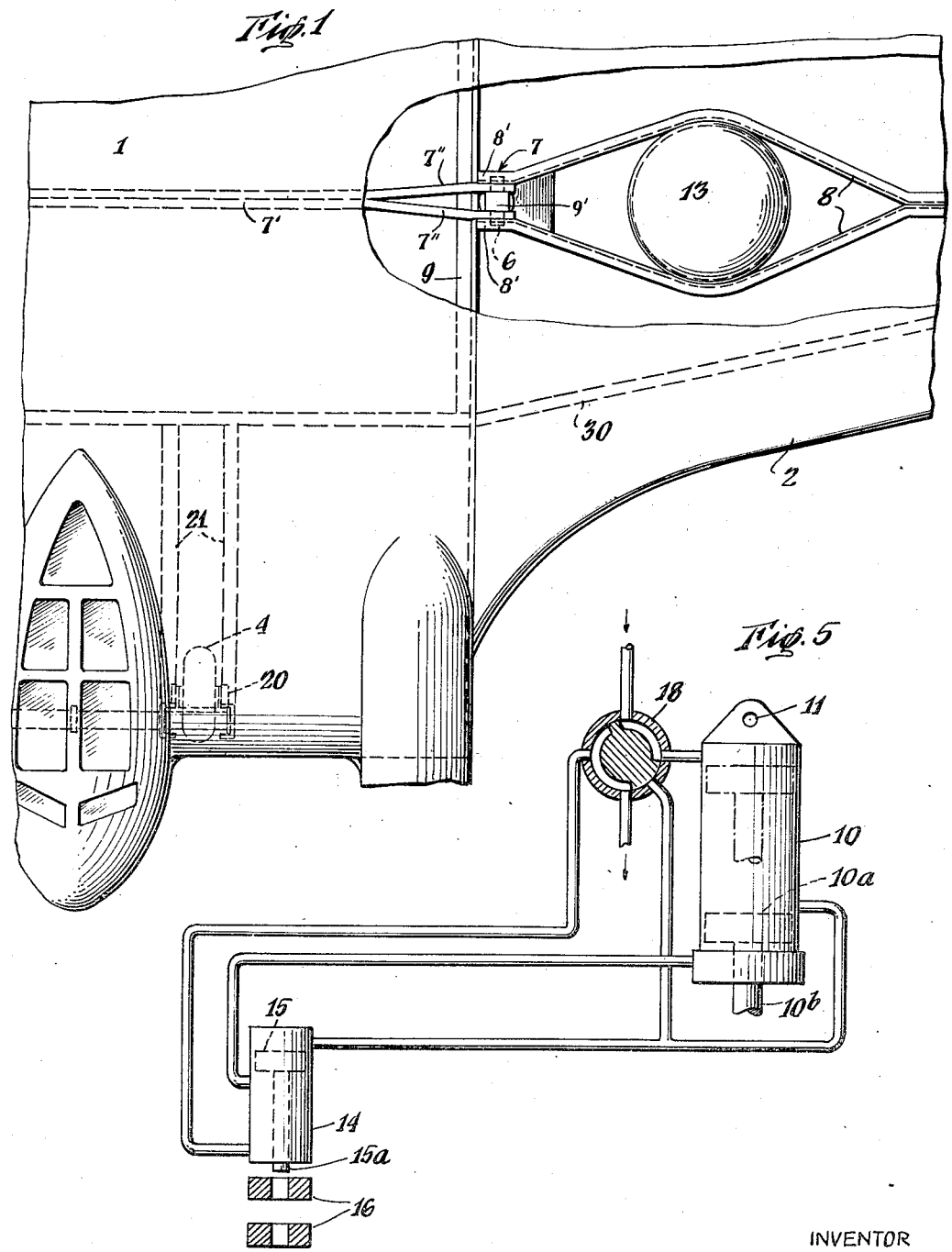
Figure 1 is a partial plan view, partly in section of a Burnelli type, lifting fuselage airplane, showing a well for receiving a retracted traction wheel, said well formed between arched wing spars of an outboard spar section.

In said figures let 1 indicate the fuselage of a Burnelli type airplane, 2 an outspanned wing thereof, 3 one of the main traction wheels and 4 a forward wheel.

The drawings show one side only of the airplane, the other side (not appearing) being similarly equipped.

The wheel 3 is carried by a shock absorbing strut 5 which is shown as pivotally supported to a fitting, which I have designated generally by the numeral 7. The fuselage bulkhead is indicated by the numeral 9. The spanwise fuselage bulkhead 7' is composed of two members secured together in any suitable manner for a major portion of their lengths, however near each end adjacent to bulkheads 9 the members are separated forming diverging arms 7'' which are secured to the spaced ends 8' of the wing spar 8 by means of a bolt or pivot pin 6, a bushing 9' may be combined with the bolt. The strut 5 is pivotally connected to pin 6 as is clearly illustrated in Fig. 2 of the drawings. The point of connection of strut 5 to the fitting is located at a point rearward of the centre of gravity of the airplane.

Figure 2:
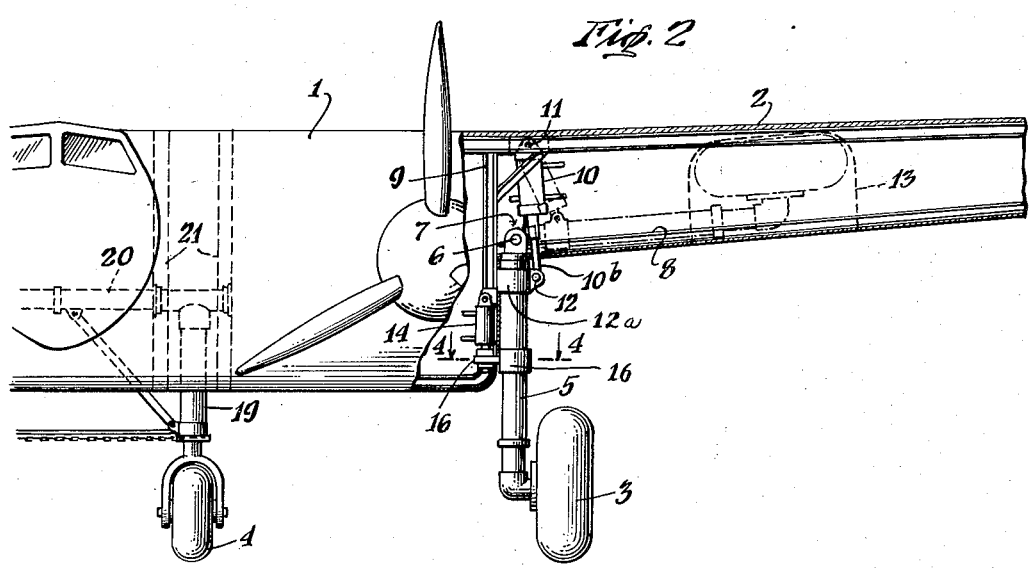
Fig. 2 is a front view, partly in section, of Fig. 1.
Figure 3:
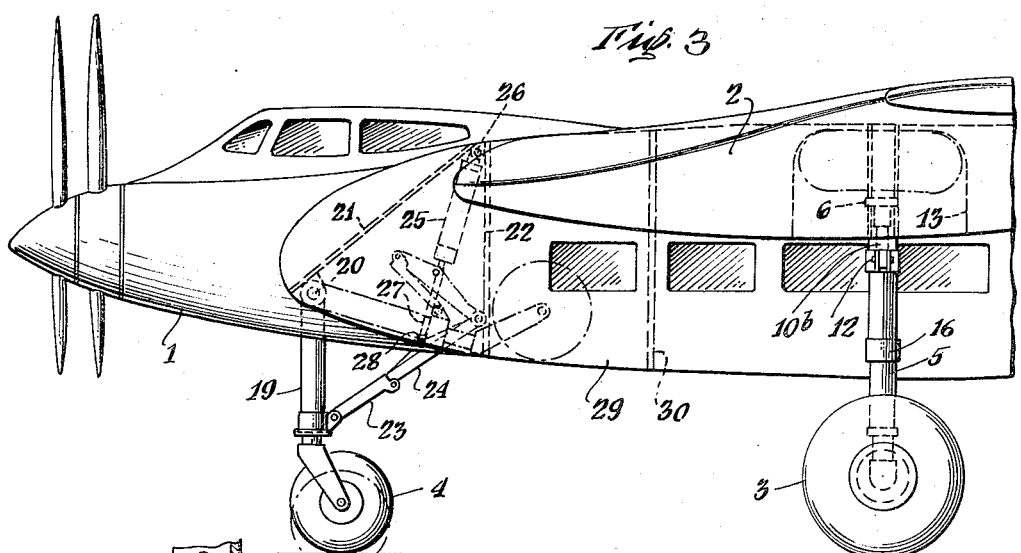
Fig. 3 is a partial side view of the airplane.

A hydraulic jack, including an oleo cylinder 10, which is included in the hydraulic system, is pivotally supported at 11, and has a piston 10a whose stem 10b is pivotally supported by pivot 12 that is carried by a strap 12a borne by wheel strut 5, whereby said piston, when retracted, will move strut 5 with its wheel 3, from the pendent position indicated in full lines in Figs. 2 and 3, to the horizontal position, indicated in dotted lines, in said figures, with the wheel lying in the well 13 that is shown in Fig 1 as formed within the divided wing spar 8.

Figure 4:
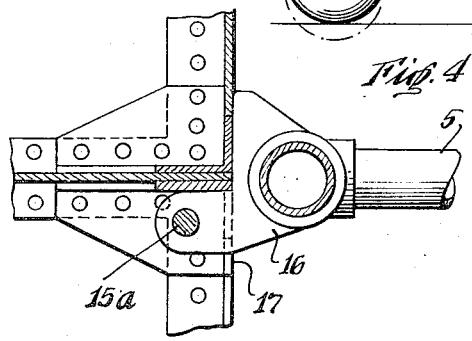
Fig. 4 is an enlarged detail of the wheel locking mechanism, taken on the line 4—4 of Fig. 2.

Wheel 3, when lowered for traction purposes, with its strut 5 lying against the wall of the fuselage, is to be there locked against retraction, this locking operation to be performed as an automatic function of the hydraulic system. Therefore, see particularly Figs. 5 and 4, a cylinder 14, that is included in the hydraulic system, is provided with a piston 15 whose stem 15a is adapted to enter apertures in a bracket 16 that extends from the strut 5 and is entered through a slot 17 formed in the side wall of the fuselage.

The fluid control valve 18 in the hydraulic system has piping in communication respectively with the cylinders 10 and 14 and the fluid pressure is directed first to lower the strut 5 and wheel 3 to ground position and then to move the piston stem 15a into its locking position in bracket 16. The locking gear is accessible from the body interior.

The forward landing wheel, or wheels, here indicated at 4, are shown as carried by a supporting sturt 19 that is pivotally connected, at 20, to frame 21 that extend from the forward bulkhead, 22, said frames forming the pilots' compartment. Linked levers 23, 24, pivoted respectively to strut 19 and a fitting on bulkhead 22, enable the strut 19 and wheel 4 to be retracted into the fuselage in the following manner:

A cylinder 25, pivotally suspended as at 26 from a fitting at the top of bulkhead 22, said cylinder included in the hydraulic system, has a piston whose stem 27 is in pivotal engagement, at 28, with lever 24, said piston stem being extended when wheel 4 is in ground contact, but as hydraulic pressure retracts the piston in cylinder 25, thereby wheel 4, its strut and linkage are retracted into a cargo compartment 29 that is located forward of the front spar bulkhead 30.

Variations within the spirit and scope of my invention are equally comprehended by the foregoing disclosure.

I claim:

1. In a lifting fuselage airplane, a wing spar, a fuselage bulkhead, means connecting the wing spar and bulkhead, a landing gear shock absorbing strut pivotally connected to said connecting means, said strut being movable between extended and retracted positions, the outboard wing panel provided with a well, the wing spar being arched in a horizontal plane to clear the well.

2. In a lifting fuselage airplane, a wing spar, a fuselage bulkhead, a fitting which connects the wing spar and bulkhead, a landing gear shock absorbing strut pivotally connected to said fitting, said strut being movable between extended and retracted positions, and an oleo jack for retraction pivotally supported at a point above said strut.

3. In a lifting fuselage airplane, a wing spar, and a fuselage bulkhead, the wing spar and fuselage bulkhead each having spaced arms at the ends thereof, a fitting connecting the arms of the fuselage bulkhead and the wing spar together and said fitting including a bolt extending through all of said arms, and a landing gear shock absorbing strut pivotally connected to and supported by said bolt, said strut being movable between extended and retracted positions, and an oleo jack for retraction pivotally supported at a point above said strut.

VINCENT J. BURNELLI.

REFERENCES CITED

The following references are of record in the file of this patent:

UNITED STATES PATENTS

| Number | Name | Date |
| --- | --- | --- |
| 1,685,122 | Carns | Sept. 25, 1928 |
| 2,224,481 | Laraque | Dec. 10, 1940 |
| 2,224,641 | Burnelli | Dec. 10, 1940 |
| 2,281,673 | Burnelli | May 5, 1942 |
| 2,318,568 | Wintermute et al. | May 4, 1943 |
| 2,338,046 | Lloyd | Dec. 28, 1943 |